Nov. 13, 1951 — R. R. THOMAS — 2,575,146
PIPE LINE SCRAPER INSERTER AND REMOVER
Filed May 2, 1947 — 2 SHEETS—SHEET 2
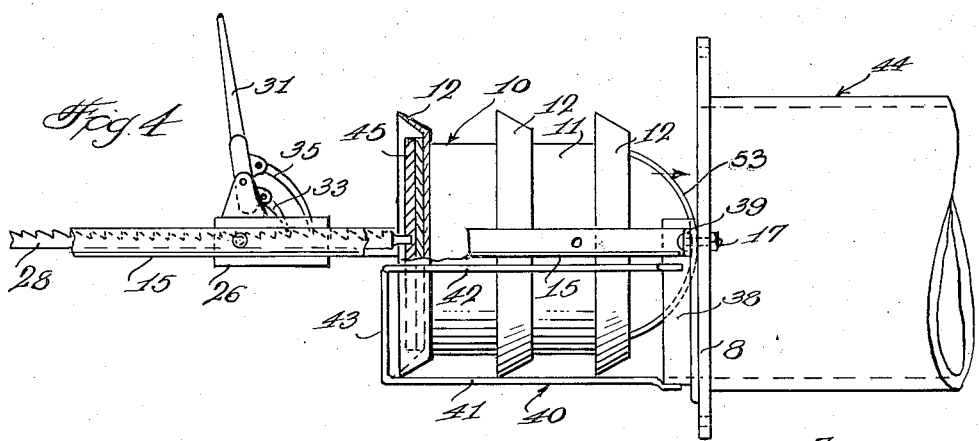
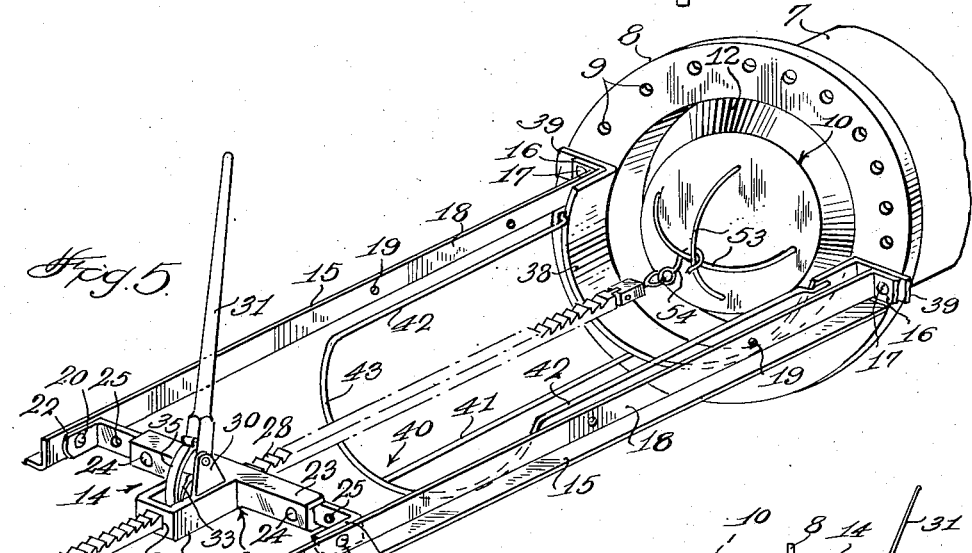
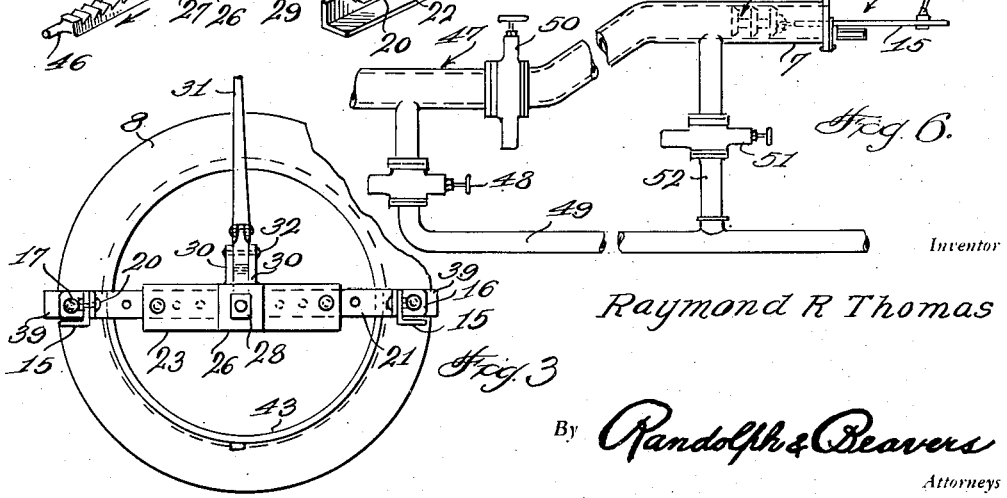
Inventor
Raymond R Thomas
By Randolph & Beavers
Attorneys

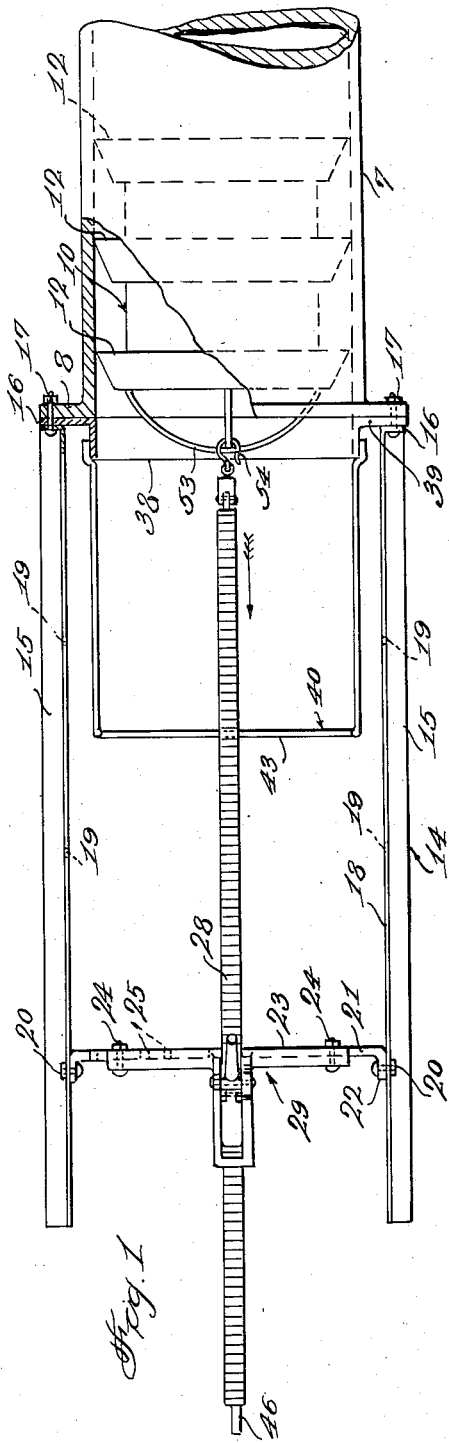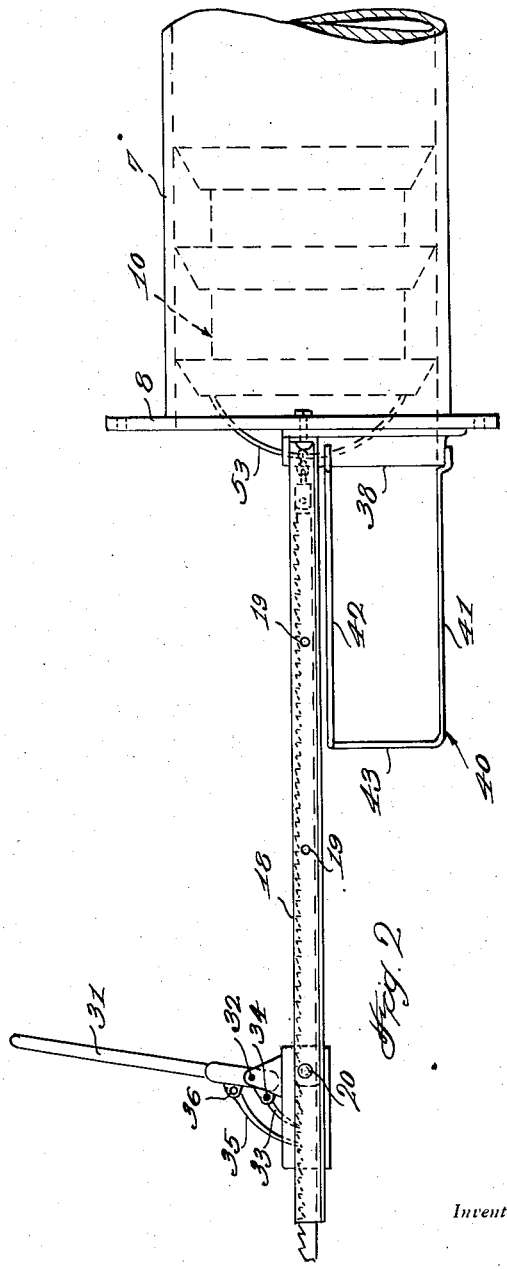

UNITED STATES PATENT OFFICE 2,575,146

PIPE LINE SCRAPER INSERTER AND REMOVER

Raymond R. Thomas, Childress, Tex.

Application May 2, 1947, Serial No. 745,448

2 Claims. (Cl. 15—104.06)

This invention relates to a structure for use in inserting a pipeline scraper into a pipeline and for thereafter removing the scraper from the pipeline at another point therein and has particular reference to a unit of extremely simple construction and which by simple adjustment may be utilized either as a feed mechanism for inserting the scraper into the pipeline or as an extracting mechanism for removing the scraper therefrom.

Another object of the invention is to provide a scraper inserter and remover which is constructed and arranged to be adjusted for fitting pipelines of various diameters and which is provided with supporting and guiding means for guiding and supporting the scraper as it is applied to a pipeline or during its removal therefrom.

Various other objects and advantages of the invention will hereinafter become more fully apparent from the following description of the drawings, illustrating a preferred embodiment thereof, and wherein:

Figure 1 is a top plan view, partly in section showing the invention applied to an end of a pipeline trap and being employed for removing a scraper therefrom;

Figure 2 is a side elevational view thereof;

Figure 3 is an end view looking from left to right of Figure 1;

Figure 4 is a side elevational view, partly in section and partly broken away showing the invention as employed for applying a scraper to a pipeline trap;

Figure 5 is a perspective view of the apparatus shown applied as in Figures 1 to 3, and Figure 6 is a fragmentary side elevational view illustrating a portion of a pipeline and showing the scraper about to be removed from an outlet trap thereof.

Referring to the drawings, 7 designates generally the outlet end of a trap forming a part of a pipeline and which is provided at its end with an outwardly projecting annular flange 8 having circumferentially spaced apertures 9, as best seen in Figure 5. A scraper, designated generally 10, comprising a substantially cylindrical body 11 of an external diameter considerably less than the internal diameter of the pipe 7, is shown disposed therein. The scraper 10 is provided with a plurality of longitudinally spaced scraper discs or rings 12 each of which extends around the body 11. The rings 12 are each frusto-conical in shape and converge toward the forward or left hand end of the scraper 10, as seen in Figures 1 and 2.

The scraper inserter and remover, comprising the invention, is designated generally 14 and includes two elongated pieces of angle iron 15 each provided with an inturned flange 16 at one end thereof. The flanges 16 are apertured to receive the shanks of nut and bolt fastenings 17 which also extend through diametrically opposed apertures 9 for securing the angle irons 15 to the flange 8 and so that said angle irons will project from the flanged end of the trap 7 in substantially parallel relationship to one another.

As clearly illustrated in Figure 1, the angle irons 15 are provided with adjacently disposed substantially parallel sides 18 which are provided with longitudinally spaced transversely aligned apertures 19 for selectively receiving fastenings 20 for securing an arm 21 to the inner side of each flange 18. The arms 21 are provided with laterally turned outer ends 22 which engage the inner sides of the flanges 18 through which the fastenings 20 extend for positioning said arms 21 in transverse alignment and in inwardly extending relationship relatively to one another.

The arms 21 are detachably engaged by a channel member 23 which is detachably and adjustably fastened thereto by fastenings 24 which extend through selective openings 25 in the arms 21.

As best seen in Figure 5, the channel member 23 is provided with a yoke or frame 26 which projects perpendicularly from the intermediate side thereof and intermediate of the ends of said channel member and which is substantially U-shaped, as seen in Figure 1. The bight portion of the frame 26 is provided with a rectangular opening 27 for receiving an elongated rack bar 28 which extends slidably therethrough and through said frame 26 and channel bar 23. The arms 21 and channel bar 23, including the frame 26, combine to form an adjustable cross head of the apparatus 14 which is capable of being extended by means of the longitudinally spaced openings 25 in the arms 21 for application to the angle irons 15, spaced various distances apart depending upon the diameter of the pipe 7 to which they are applied, and which cross head, designated generally 29, may be positioned at various distances from the flanged end of the pipe 7 by application of the fastenings 20 to the various aligned apertures 19.

As best seen in Figures 4 and 5, the sides of the frame or yoke 26 are provided with ears 30 which rise from the upper edge thereof and which are laterally spaced to loosely receive an end of a lever 31 therebetween. A pivot pin 32 extends through the lever 31 adjacent said end and is secured at its ends in the ears 30 for pivotally mounting the lever on the frame 26. The lever 31 is provided with a pawl 33 which is pivotally mounted thereon at 34 below the lever pivot 32, and a second, longer pawl 35 is pivotally mounted at 36 on the lever 31 above or on the opposite side of the pivot 32. The pawls 33 and 35 project in the same direction from the lever 31 and combine therewith to provide a double acting jack through engagement with the upwardly facing teeth for advancing rack bar 28 through the cross head 29 in a step by step movement when the lever 31 is oscillated.

A scraper support and guide, constituting a part of the apparatus 14 includes a substantially semi-circular flange 38 which projects outwardly from the flange 8 and which is detachably secured thereto by integral outturned ears 39 which project from the ends of the flange 38 and which are disposed between the flange 8 and the flanges 16 and secured to the flange 8 by the fastenings 17. A wire frame 40 of substantially semi-circular cross section including a bottom longitudinal strand 41, longitudinal side strands 42 and an arcuate outer end strand 43 is secured to and projects outwardly from said flange 38. The inner ends of the strands 41 and 42 are outwardly offset and secured to the outer side of the flange 38, as best seen in Figures 1 and 2 for aligning the inner side of the wire frame 40 with the inner side of the flange 38 and with the bottom half of the bore of the pipe 7.

Assuming that it is desired to insert the scraper 10 into an inlet trap 44, as seen in Figure 4 and which is of the same construction as the outlet trap 7, including the flange 8, the apparatus 14 is applied as previously described except that the cross head 29 is turned around so that the yoke or frame 26 thereof extends inwardly, as seen in Figure 4, instead of outwardly, as seen in Figures 1 and 2. When thus disposed, a disc 45 can be applied to the tapered end 46 of the ratchet 28 and said disc 45 engages against the rear end of the scraper 10 which is supported on the guide cage 40. By oscillating the lever 31, the ratchet bar 28 will be fed toward the inlet trap 44 for advancing the scraper 10 into said trap and until it is beyond the first connection or joint, not shown, of an oil line of which the trap 44 forms a part and which has been shut off prior to applying the scraper 10.

The flanged end 8 of the trap 44 is then sealed and the line of which said trap forms a part is then opened to permit oil to flow into the line through the joint or connection beyond which the scraper has been advanced by the apparatus 14. The pressure of the oil behind the scraper 10 will force said scraper through the pipe line, a portion of which is shown in Figure 6 and designated generally 47. When the scraper 10 reaches a portion of the pipeline 47 as seen in Figure 6, and which may be located at a pumping station a considerable distance from another pumping station or a point where the inlet trap 44 was located, the oil pressure in the pipe line behind the scraper 10 will cause it to pass the connection of an offset extension 49 of said pipeline 47 and which is normally open. This will position the scraper adjacent the valve 50, which is normally closed. When the scraper is so disposed, the valve 50 is opened and a valve 48 in the line 49 is closed to prevent passage of the oil therethrough. A lateral pipe 52 located to form a communication between the trap 7 and the pipe 49, beyond its valve 48, is provided with a valve 51 which is normally closed but which is opened when the valve 50 is opened so that the oil may force the scraper 10 into the trap 7 as seen in dotted lines in Figure 6 so as to uncover the pipe 52 to permit the oil to flow thereto into the pipe 49. When the scraper 10 is disposed in the trap 7 the valve 48 is opened and the valves 50 and 51 closed, after which a closure, not shown, attached to the flange 8 of the trap 7 may be removed and the apparatus 14 is then applied to said flange 8, as clearly illustrated in Figures 1, 2 and 5 and with the frame 26 extending away from the trap 7.

As best seen in Figure 5, the opposite end of the rack bar 28, which is thus disposed adjacent the trap 7, is provided with a hook 54 and the leading end of the scraper 10 has cross bails 53 projecting therefrom and detachably engaged by the hook 54 so that when the jack lever 31 is operated, in the same manner as previously described, the rack bar 28 will be fed outwardly for drawing the scraper 10 from the trap 7 and onto the guide and supporting rack 40, from which it can be manually removed. The apparatus 14 is then detached from the flange 8 of trap 7 after which a conventional closure may be applied to said flange.

Obviously, the inserting and removing apparatus 14 may be utilized with the scraper 10 for removing paraffin from oil lines of various constructions and the rack bar 28 as well as the angle irons 15 may be made of various lengths for accommodating traps of various lengths. Ordinarily, the inlet traps are of a greater length than the outlet traps of pipelines and accordingly the apparatus 14 will be made capable of sufficient movement for advancing the scraper 10 through an inlet trap 44 of any conventional length for scraping the paraffin therefrom and for advancing the scraper to beyond the first connection adjacent the trap, so that it will be carried thereon through the pipeline by the pressure of the oil behind the scraper. As previously stated, the apparatus 14 is capable of adjustment in width to accommodate pipelines of various diameters.

Various other modifications and changes are likewise contemplated and may obviously be resorted to, without departing from the spirit and scope of the invention as hereinafter defined by the appended claims.

I claim as my invention:

1. In a pipeline scraper inserter and remover, an elongated open frame adapted to be detachably connected to the flanged end of a pipeline trap and projecting outwardly therefrom and disposed substantially axially thereof, said frame including spaced substantially parallel side members, a cross head forming a part of said frame and disposed transversely thereof, said cross head being reversibly disposed in the frame, a rack bar reciprocably disposed in the cross head for movement longitudinally of the frame and having means for engaging the end of a scraper for inserting the scraper into and removing it from the pipeline trap, and a lever and pawl means swingably supported by the cross head for moving the rack bar therethrough, the lever of said lever and pawl means being pivotally supported to swing in a plane generally parallel to the directions in which said side members extend.

2. A scraper inserter and remover as in claim 1, said cross head forming a detachable part of the frame and being removable connected at its ends thereto for reversibly positioning the cross head with respect to the frame whereby the rack bar may be advanced by said lever and pawl means in either direction relatively to the frame.

RAYMOND R. THOMAS.

REFERENCES CITED

The following references are of record in the file of this patent:

UNITED STATES PATENTS

| Number | Name | Date |
|---|---|---|
| 152,608 | Cornell | June 30, 1874 |
| 604,808 | Uptegrove | May 31, 1898 |
| 620,366 | Salenius | Feb. 28, 1899 |
| 694,324 | Pearsall | Feb. 25, 1902 |
| 952,130 | Mueller | Mar. 15, 1910 |
| 1,006,261 | Mueller | Oct. 17, 1911 |
| 1,230,786 | Robertson | June 19, 1917 |
| 1,547,975 | Thingstad | July 28, 1925 |
| 1,732,175 | Thompson | Oct. 15, 1929 |
| 2,028,779 | Howe et al. | Jan. 28, 1936 |
| 2,288,906 | Kaplan | July 7, 1942 |
| 2,461,983 | Jarrett | Feb. 15, 1949 |